(12) United States Patent
Vollmer et al.

(10) Patent No.: US 12,528,439 B2
(45) Date of Patent: Jan. 20, 2026

(54) TENSIONING DEVICE FOR A SAFETY BELT COMPONENT

(71) Applicant: AUTOLIV DEVELOPMENT AB, Vargarda (SE)

(72) Inventors: Saskia Vollmer, Elmshorn (DE); Andre Gajek, Norderstedt (DE); Dietmar Legde, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 237 days.

(21) Appl. No.: 18/260,722

(22) PCT Filed: Jan. 10, 2022

(86) PCT No.: PCT/EP2022/050337
§ 371 (c)(1),
(2) Date: Jul. 7, 2023

(87) PCT Pub. No.: WO2022/152650
PCT Pub. Date: Jul. 21, 2022

(65) Prior Publication Data
US 2024/0300440 A1   Sep. 12, 2024

(30) Foreign Application Priority Data
Jan. 12, 2021   (DE) .................. 10 2021 100 437.3

(51) Int. Cl.
  B60R 22/34   (2006.01)
(52) U.S. Cl.
  CPC ........ B60R 22/3405 (2013.01); B60R 22/341 (2013.01)
(58) Field of Classification Search
  CPC .............. B60R 22/3405; B60R 22/341; B60R 22/1955; B60R 22/1954; B60R 22/1952
  See application file for complete search history.

(56) References Cited

U.S. PATENT DOCUMENTS

| 3,871,470 A | 3/1975 | Schwanz et al. |
| 5,897,140 A * | 4/1999 | Wier ................. F15B 15/19 280/806 |

(Continued)

FOREIGN PATENT DOCUMENTS

| DE | 2223061 A | 11/1973 |
| DE | 19546280 A1 | 6/1997 |

(Continued)

OTHER PUBLICATIONS

Nagatomo, Seat Belt Device, Dec. 1, 2016, EPO, WO 2016190046 A1, Machine Translation of Description (Year: 2016).*

*Primary Examiner* — Paul N Dickson
*Assistant Examiner* — Matthew D Lee
(74) *Attorney, Agent, or Firm* — Dickinson Wright PLLC

(57) ABSTRACT

A tensioning device for a safety belt component, comprising a gas generator for generating a pressurized gas, a piston that can be driven by the pressurized gas, a tension cable that is connected to the piston and is connectable to a safety belt component to be set into a tensioning movement, a tensioner tube for receiving and guiding the piston, and a guide block that forms a cable guide and in which a receptacle receiving the gas generator and a pressure chamber fluidically connected to the receptacle are formed, wherein the guide block is connected to the tensioner tube and the tension cable runs rectilinearly in a piston movement direction from the tensioner tube through the pressure chamber, and wherein at least one damping element is formed, which absorbs the kinetic energy of the safety belt component in the event of a load-free tensioning movement.

15 Claims, 8 Drawing Sheets

(56) References Cited

U.S. PATENT DOCUMENTS

Figure 1:
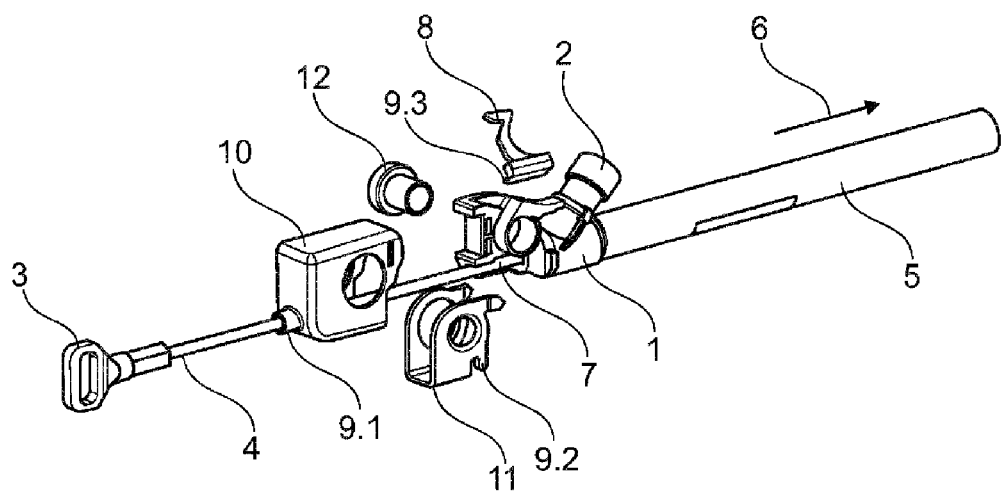

| | | | |
|---|---|---|---|
| 6,068,664 A | 5/2000 | Meyer et al. | |
| 6,131,951 A * | 10/2000 | Chicken | B60R 22/1952 |
| | | | 280/806 |
| 6,250,720 B1 * | 6/2001 | Wier | B60R 22/4619 |
| | | | 297/480 |
| 6,299,211 B1 * | 10/2001 | Wier | B60R 22/1952 |
| | | | 297/480 |
| 2003/0030264 A1 * | 2/2003 | Motozawa | B60R 22/1952 |
| | | | 280/806 |
| 2010/0090454 A1 * | 4/2010 | Sugiyama | B60R 22/1955 |
| | | | 280/806 |
| 2010/0176649 A1 * | 7/2010 | Kohama | B60R 22/1955 |
| | | | 297/480 |
| 2013/0299620 A1 * | 11/2013 | Miyoshi | B60R 22/1952 |
| | | | 242/374 |
| 2023/0064059 A1 | 3/2023 | Legde | |

FOREIGN PATENT DOCUMENTS

| | | | | |
|---|---|---|---|---|
| DE | 102015111083 B4 | 7/2018 | | |
| GB | 2337029 A | 11/1999 | | |
| JP | 6420474 B2 | 11/2018 | | |
| WO | WO-2016190046 A1 * | 12/2016 | | B60R 22/195 |
| WO | 2017/005718 A1 | 1/2017 | | |
| WO | 2021156015 A1 | 8/2021 | | |
| WO | WO-2024052391 A1 * | 3/2024 | | B60R 22/1952 |

\* cited by examiner

TENSIONING DEVICE FOR A SAFETY BELT COMPONENT

The present invention relates to a tensioning device for a safety belt component, comprising a gas generator for generating a pressurized gas, a piston that can be driven by the pressurized gas, a tension cable which is connected to the piston and is connectable to a safety belt component to be set into a tensioning movement, a tensioner tube for receiving and guiding the piston, and a guide block that forms a cable guide and in which a receptacle receiving the gas generator and a pressure chamber fluidically connected to the receptacle are formed, wherein the guide block is connected to the tensioner tube and the tension cable runs rectilinearly in a piston movement direction from the tensioner tube through the pressure chamber.

Such a tensioning device is known, for example, from DE 10 2015 111 083 B4, wherein the guide block forms a cable deflection means, so that the tension cable is deflected, from the pressure chamber toward the safety belt component to be tensioned, by a deflection guide in the guide block transversely to the piston movement direction. Such a deflection of the tension cable by the guide block has hitherto been necessary since the tensioning device is mounted laterally next to a vehicle seat and the piston movement direction is oriented parallel to the longitudinal axis of the vehicle, while the tension cable is used, in general, to tension a belt buckle or an end fitting of a safety belt as a safety component. There are now considerations that the tension cable will run through the guide block rectilinearly or parallel at an offset to the rectilinear orientation in the tensioner tube. In the case of such a design of the guide block, however, the problem arises that, in the case of a load-free tensioning process, the safety belt component connected to the tension cable hits the guide block unbraked, as a result of which the guide block can be damaged. If the damage is such that the pressure chamber formed by the guide block is no longer closed, flames can escape from the pressure chamber at points not intended for this.

The problem addressed by the present invention is therefore that of at least partially eliminating the disadvantages described with respect to the prior art and, in particular, providing a tensioning device with which the escaping of flames is prevented even in the case of a load-free tensioning process.

One possible solution to this problem is given by a tensioning device having the features of independent claim 1. Another tensioning device and advantageous developments of the tensioning device are specified in the dependent claims and in the description; individual features of the advantageous developments can be combined with one another in a technically sensible manner.

The problem is solved by means of a tensioning device which is provided for a safety belt component and which can have a gas generator for generating a pressurized gas. The tensioning device can also have a piston which can be driven by the pressurized gas and to which a tension cable is connected, the tension cable being connectable or connected to a safety belt component (such as a belt buckle or an end fitting) that is to be set into a tensioning movement. The tensioning device can also comprise a tensioner tube into which the piston is received and which guides the piston during the tensioning movement. The tensioning device can also have a one-piece or multi-piece guide block in which a receptacle receiving the gas generator and a pressure chamber fluidically connected to the receptacle is formed. The guide block is in particular connected to the tensioner tube and is in particular designed such that the tension cable runs rectilinearly in a piston movement direction from the tensioner tube through the pressure chamber. The guide block can be designed such that the tension cable either exits the guide block transversely to the piston movement direction or exits the guide block parallel in alignment with or parallel at an offset to the rectilinear piston movement direction. Accordingly, the guide block forms a linear guide which adjoins the pressure chamber and which is designed such that the tension cable can be led out of the guide block parallel to the piston movement direction on the side opposite from the tensioner tube. At least one resistance element described further below, which counteracts an unintentional movement of the tension cable, can be inserted in the linear guide.

The tensioning device can in particular have a (flame protection) housing which at least partially surrounds the guide block and which is designed such that flames shooting from the pressure chamber through the guide block along the tension cable are held back.

The tensioning device can also have at least one resistance element, which in particular is inserted in the guide block and counteracts an unintentional movement of the tension cable. Such a resistance element has, for example, ribs on the surface facing the tension cable, which increase the static friction with the tension cable. In particular, if the tension cable runs completely rectilinearly or with a parallel offset from the pressure chamber through the guide block, such a resistance element can ensure that the tension cable is not unintentionally moved through the guide block during normal use. On the other hand, when a tensioning process occurs, the resistance element imparts only relatively low dynamic friction. Such a resistance element is, in particular, set into the guide block transversely to the movement direction of the tension cable. But this also means that, between the guide block and the resistance element, gaps remain, through which flames possibly can escape during a normal tensioning process. With the previously described (flame protection) housing, a further escape of flames can be prevented or at least minimized.

The guide block generally has an opening, which preferably is circular and/or in particular extends transversely to the direction of extension of the cable and by means of which the tensioning device can be fastened to the motor vehicle. For example, a fastening means (such as a screw, in particular a preloaded screw, optionally with a collar, or a bolt) can be fed through the opening. In order to make the fastening of the tensioning device to the motor vehicle more stable, a bushing can be inserted into the guide-block opening, through which the fastening means (screw or bolt) is fed.

In particular in this context it can be provided, for further improvement of the mechanical stability of the tensioning device, that the tensioning device has a stabilizing holder as a type of cage. The holder can in particular be made of a metal material and preferably has a U-shaped cross-section. In addition, the holder has in particular two holes which, after assembly has been performed, are associated with the opening in the guide block so that the opening and the holes in the holder are aligned with one another. Thus the holder, which in particular is made of metal, at least partially surrounds the guide block. To fasten the holder to the tensioning device, the holder can be riveted to the bushing fed through the opening in the guide block.

It can now be provided that the tensioning device has at least one damping element, which at least partially absorbs the kinetic energy of the safety belt component in the event of a load-free tensioning movement.

For example, the safety belt component can be fastened directly or by means of a fastening element, in particular at one end of the tension cable. The damping element is designed and arranged such that, if the safety belt component itself or the fastening element hits another element of the tensioning device during a load-free tensioning process (in which the safety belt component is thus accelerated (almost) without counterforce after the triggering of the gas generator), the kinetic energy of the safety belt component is at least partially absorbed by an intended deformation or fracture of the damping element. It is thus possible to prevent the region of the guide block that forms the pressure chamber from being damaged so that no flames can escape from the pressure chamber at points not intended for this.

The damping element is realized in particular by a protrusion which is formed on a part of the tensioning device and which is deformed or fractured (off) due to the kinetic energy of the safety belt component during a load-free tensioning process.

Thus, a protrusion realizing the damping element can be formed in particular on the (flame protection) housing, the holder and/or the resistance element.

If the damping element is formed on the housing of the tensioning device, the protrusion is in particular formed as a collar surrounding the tension cable. In other words, the tension cable is guided through the housing at a point at which the housing has an elevation extending along the cable as a protrusion. This protrusion surrounds the tension cable in particular completely. In this case, the protrusion is thus formed at a point at which the safety belt component or its fastening element first comes into contact with the other components of the tensioning device.

If a damping element is formed on the holder, this damping element is formed in particular in a portion of the holder that rests against the guide block. In particular, the holder has two protrusions, which rest against the guide block, one on either of two opposite sides of the tension cable. The at least one protrusion is oriented such that the protrusion can deform in such a way that the other portions of the holder can move toward the pressure chamber or toward the tensioner tube during the deformation.

If a damping element is formed on the resistance element, the damping element is realized in particular by the fact that the resistance element projects beyond the guide block. The resistance element thus extends in particular along the tension cable beyond an outer contour of the guide block. If, after a load-free tensioning process, the safety belt component or its fastening element hits the tensioning device, the resistance element is deformed.

If the tensioning device has a resistance element, an independent invention is seen, independently of the above-described solution, in the fact that the tensioning device has a holder which fixes the resistance element in the guide block. In this case, it is provided in particular that the holder is fastened to the guide block in a form-locking manner by means of a bushing and that the holder is connected to the bushing by means of a rivet connection.

Since the resistance element is fixed by means of the holder, no additional arrangements have to be made to securely mount the resistance element, which is inserted into the guide block, as a constituent part of the tensioning device. In addition, this allows the resistance element to be held in a position in which it suitably counteracts an unintentional movement of the tension cable.

In this regard, it is provided in particular that, by fastening (in particular riveting) of the holder to the guide block, the resistance element is brought into an operative position in which the resistance element counteracts an unintentional movement of the tension cable. The holder and the resistance element are thus designed such that, before the riveting operation, the resistance element does not yet apply to the tension cable a force sufficient for preventing an unintentional movement and, after the riveting operation, the resistance element is shifted toward the tension cable such that a force sufficient for preventing an unintentional movement is applied to the tension cable.

Figure 2:
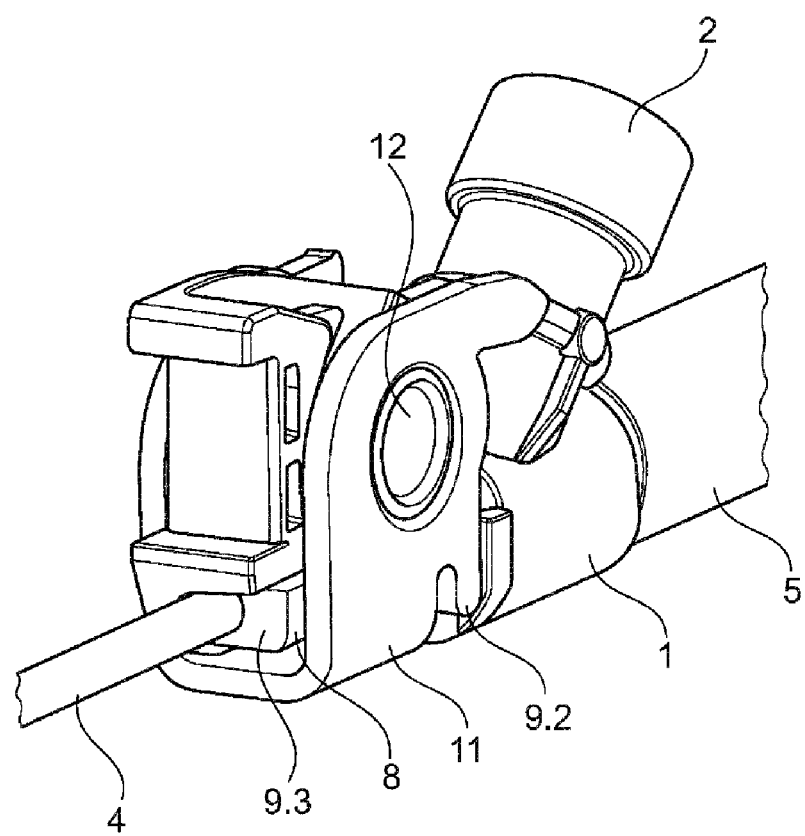
Figure 3:
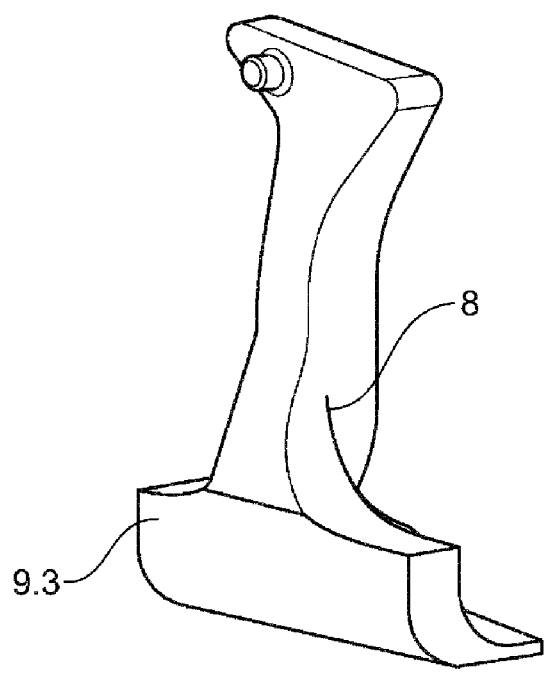
Figure 4:
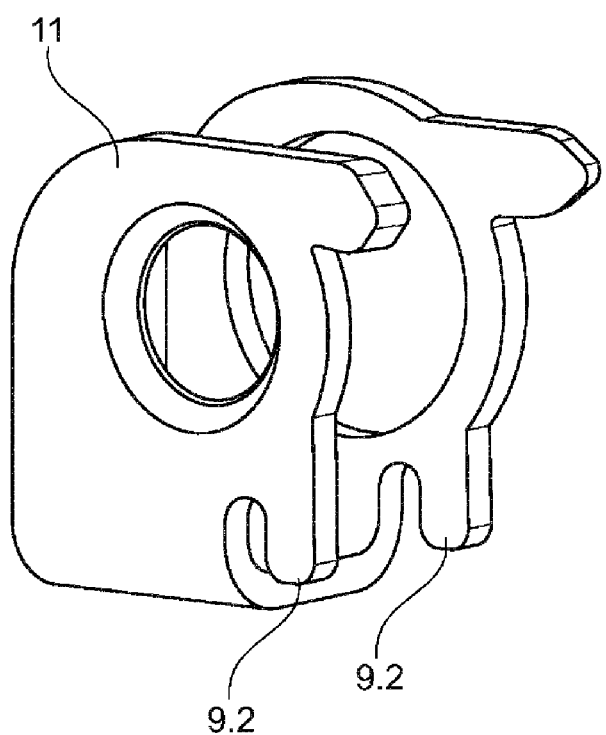
Figure 5:
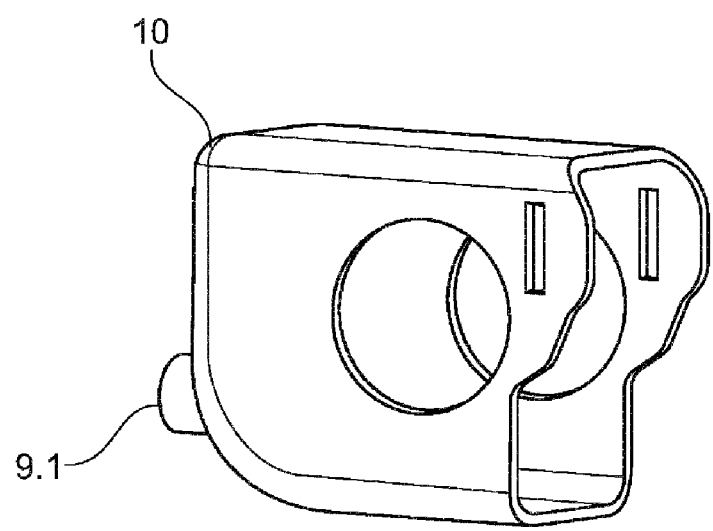
Figure 6:
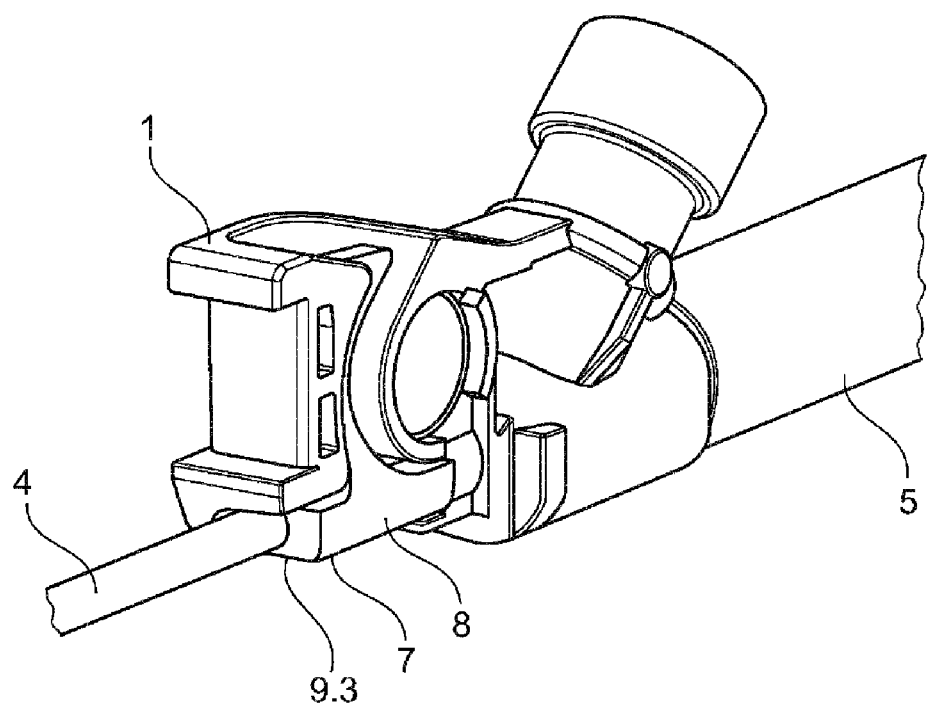
Figure 7:
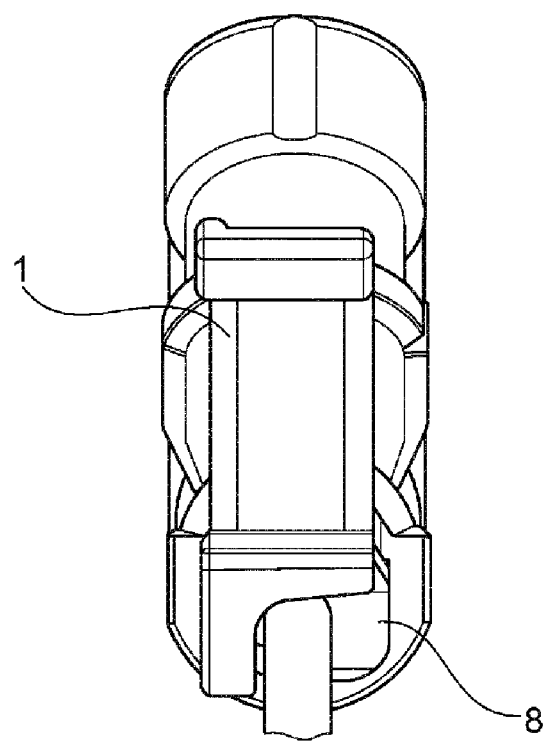
Figure 8:
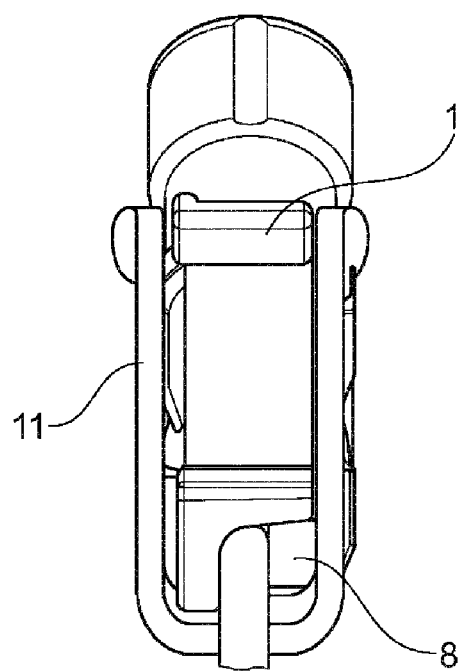

The invention and the technical environment are explained below by way of example with reference to the figures. The following are shown schematically:

FIG. 1: shows a partially exploded view of a tensioning device,

FIG. 2: shows the tensioning device without a housing,

FIG. 3: shows a resistance element of the tensioning device,

FIG. 4: shows a holder of the tensioning device,

FIG. 5: shows the housing of the tensioning device,

FIG. 6: shows the tensioning device without the housing and the holder,

FIG. 7: shows the guide block of the tensioning device with the resistance element before the holder has been fastened, and FIG. 8: shows the view of FIG. 7 after the holder has been riveted.

The tensioning device shown in an exploded view in FIG. 1 comprises a guide block 1 with a receptacle 2 for a gas generator (not shown). A pressure chamber, which cannot be seen in the figures and which the gas generated by the gas generator enters, is formed in the guide block 1.

The guide block 1 also forms a linear guide 7 for a tension cable 4. A safety belt component 3 is fastened to the tension cable 4. The tension cable 4 guided through the linear guide 7 enters, through the pressure chamber, a tensioner tube 5, in which the tension cable 4 is connected to a piston (not visible). By the triggering of the gas generator, the piston is accelerated in the tensioner tube 5 in a piston movement direction 6, and as a result the tension cable 4 is pulled through the guide block 1.

In addition, a resistance element 8 is inserted into the linear guide 7; once assembly has been completed, the resistance element 8 ensures that the tension cable 4 cannot be inadvertently moved through the guide block 1.

The tensioning device also comprises a holder 11, which is shown in detail in FIG. 4 and which is produced from a metal sheet and has a U-shaped cross-section. The holder 11 has two protrusions, which each form a damping element 9.2 and which, in the mounted position, rest against the guide block 1 (see in particular FIGS. 2 and 6). The holder 11 has, in its two legs, holes which serve for connection to a bushing 12. Thus, the bushing 12 is pushed through an opening in the guide block 1 and through the holes in the holder 11, and the bushing 12 is riveted to the holder 9 for fastening.

The holder 11 and the resistance element 8 are designed such that, before the holder 11 is fastened, the resistance element 8 projects laterally beyond the guide block 1 (see FIG. 7).

During the riveting, the resistance element 8 is then pressed onto the tension cable 4 by means of the holder 11, the resistance element 8 thus being in an operative position in which the tension cable 4 is secured so as not to move unintentionally (see FIG. 8).

The tensioning device also comprises a (flame protection) housing 10 which, in the mounted position, surrounds the guide block 1 in parts and the holder 11. The housing 10 (see in particular FIG. 5) has, as a damping element 9.1, a collar, which protrudes from the housing 10 and surrounds the tension cable 4.

It can also be seen from FIG. 6 that a portion of the resistance element 8 that forms a damping element 9.3 protrudes beyond the guide block 1.

If the tensioning device is triggered and, as a result of the absence of an occupant, the safety belt component 3 is accelerated almost without counterforce, the safety belt component 3 hits the damping element 9.1 on the housing 10 almost unbraked, which immediately deforms. The damping element 9.3 of the resistance element 8 protruding beyond the guide block 1 is subsequently also deformed. Furthermore, the damping elements 9.2 of the holder 11 are also deformed when the holder 11 is pressed against the guide block 1 by the safety belt component 3.

LIST OF REFERENCE SIGNS

1 Guide block
2 Receptacle
3 Safety belt component
4 Tension cable
5 Tensioner tube
6 Piston movement direction
7 Linear guide
8 Resistance element
9.1 Damping element
9.2 Damping element
9.3 Damping element
10 Housing
11 Holder
12 Bushing

The invention claimed is:

1. A tensioning device for a safety belt component, having
a gas generator for generating a pressurized gas,
a piston that can be driven by the pressurized gas,
a tension cable that is connected to the piston and is connectable to a safety belt component to be set into a tensioning movement,
a tensioner tube for receiving and guiding the piston, and
a guide block that forms a cable guide and a receptacle receiving the gas generator and a pressure chamber fluidically connected to the receptacle,
wherein the guide block is connected to the tensioner tube and the tension cable runs rectilinearly in a piston movement direction from the tensioner tube through the pressure chamber,
wherein at least one damping element is formed, which absorbs the kinetic energy of the safety belt component in the event of a load-free tensioning movement,
wherein the tensioning device has a holder at least partially surrounding the guide block, the holder forming a first damping element of the at least one damping element, and wherein the first damping element rests, at least in parts, against the guide block.

2. The tensioning device according to claim 1, wherein the at least one damping element is in the form of a protrusion which deforms and/or fractures for absorption.

3. The tensioning device according to claim 2, further comprising a housing at least partially surrounding the guide block and holder, wherein a second damping element is formed by a protrusion on the housing of the tensioning device.

4. The tensioning device according to claim 3, wherein the protrusion is formed as a collar surrounding the tension cable.

5. A tensioning device for a safety belt component, having
a gas generator for generating a pressurized gas,
a piston that can be driven by the pressurized gas,
a tension cable that is connected to the piston and is connectable to a seat belt component to be set into a tensioning movement,
a tensioner tube for receiving and guiding the piston,
a guide block that forms a cable guide and in which a receptacle receiving the gas generator and a pressure chamber fluidically connected to the receptacle are formed, and
at least one resistance element, the resistance element being inserted into the guide block and counteracting an unintentional movement of the tension cable,
wherein the guide block is connected to the tensioner tube and the tension cable runs rectilinearly in a piston movement direction from the tensioner tube through the pressure chamber,
wherein the tensioning device has a holder, the holder fixing the resistance element in the guide block and the resistance element is brought, by fastening of the holder to the guide block, into an operative position in which the resistance element counteracts an unintentional movement of the tension cable.

6. The tensioning device according to claim 2, wherein the protrusion rests against the guide block.

7. The tensioning device according claim 1, wherein the tensioning device has at least one resistance element, which is inserted in the guide block and counteracts an unintentional movement of the tension cable, wherein a third damping element of the at least one damping element is formed by a portion of the resistance element protruding beyond the guide block.

8. The tensioning device according to claim 7, wherein the resistance element is brought, by fastening of the holder to the guide block, into an operative position in which the resistance element counteracts an unintentional movement of the tension cable.

9. The tensioning device according to claim 1, wherein the guide block forms a linear guide which adjoins the pressure chamber and which is designed such that the tension cable can be led out of the guide block parallel to the piston movement direction on the side opposite from the tensioner tube.

10. The tensioning device according to claim 9, wherein at least one resistance element, which counteracts an unintentional movement of the tension cable, is inserted in the linear guide.

11. The tensioning device according to claim 5, wherein the tensioning device has a holder and the holder forms at least one damping element, and wherein the damping element rests, at least in parts, against the guide block.

12. The tensioning device according to claim 5, wherein the holder is fastened to the guide block in a form-locking manner by means of a bushing.

13. The tensioning device according to claim 12, wherein the holder is connected to the bushing by means of a rivet connection.

14. The tensioning device according to claim 5, wherein the guide block forms a linear guide which adjoins the pressure chamber and which is designed such that the tension cable can be led out of the guide block parallel to the piston movement direction on the side opposite from the tensioner tube.

15. The tensioning device according to claim 14, wherein at least one resistance element, which counteracts an unintentional movement of the tension cable, is inserted in the linear guide.

\* \* \* \* \*